US012197627B2

(12) United States Patent
Wallach

(10) Patent No.: US 12,197,627 B2
(45) Date of Patent: Jan. 14, 2025

(54) PROCESSORS WITH SECURITY LEVELS ADJUSTABLE PER APPLICATIONS

(71) Applicant: Micron Technology, Inc., Boise, ID (US)

(72) Inventor: Steven Jeffrey Wallach, Dallas, TX (US)

(73) Assignee: Lodestar Licensing Group LLC, Evanston, IL (US)

( * ) Notice: Subject to any disclaimer, the term of this patent is extended or adjusted under 35 U.S.C. 154(b) by 221 days.

(21) Appl. No.: 17/393,248

(22) Filed: Aug. 3, 2021

(65) Prior Publication Data

US 2021/0374289 A1 Dec. 2, 2021

Related U.S. Application Data

(63) Continuation of application No. 16/210,605, filed on Dec. 5, 2018, now Pat. No. 11,100,254.

(51) Int. Cl.
*G06F 21/74* (2013.01)
*G06F 9/30* (2018.01)
*G06F 12/1036* (2016.01)
*G06F 21/60* (2013.01)
*G06F 21/72* (2013.01)

(52) U.S. Cl.
CPC .......... *G06F 21/74* (2013.01); *G06F 9/30043* (2013.01); *G06F 9/30076* (2013.01); *G06F 12/1036* (2013.01); *G06F 21/602* (2013.01); *G06F 21/72* (2013.01)

(58) Field of Classification Search
CPC .. G06F 21/74; G06F 9/30076; G06F 12/1036; G06F 12/602; G06F 21/72; G06F 9/30043
See application file for complete search history.

(56) References Cited

U.S. PATENT DOCUMENTS

| 5,943,421 | A | * | 8/1999 | Grabon | G06F 21/71 |
| | | | | | 711/E12.092 |
| 6,061,449 | A | | 5/2000 | Candelore et al. | |
| 10,503,932 | B2 | | 12/2019 | Grocutt et al. | |
| 10,671,740 | B2 | | 6/2020 | Bhattacharyya et al. | |
| 11,100,254 | B2 | * | 8/2021 | Wallach | G06F 21/72 |
| 2006/0212945 | A1 | | 9/2006 | Donlin et al. | |
| 2007/0209072 | A1 | | 9/2007 | Chen | |

(Continued)

OTHER PUBLICATIONS

International Search Report and Written Opinion, PCT/US2019/063990, mailed Mar. 18, 2020.

(Continued)

*Primary Examiner* — Paul E Callahan
(74) *Attorney, Agent, or Firm* — Greenberg Traurig

(57) ABSTRACT

Methods, systems, and apparatuses related to adjustable security levels in processors are described. A processor may have functional units and a register configured to control security operations of the functional units. The register configures the functional units to operate in a first mode of security operations when the register contains a first setting; and the register configures the functional units to operate in a second mode of security operations when the register contains a second setting (e.g., to skip/bypassing a set of security operation circuit for enhanced execution speed).

17 Claims, 6 Drawing Sheets

(56) References Cited

U.S. PATENT DOCUMENTS

| | | |
|---|---|---|
| 2009/0328155 A1* | 12/2009 | Madathilparamgil George ......... G06F 21/6218 726/4 |
| 2011/0154061 A1 | 6/2011 | Chilukuri et al. |
| 2011/0162036 A1 | 6/2011 | Heo |
| 2015/0121538 A1 | 4/2015 | Hsu et al. |
| 2016/0291974 A1 | 10/2016 | Lingam et al. |
| 2017/0024573 A1 | 1/2017 | Bhattacharyya et al. |
| 2017/0323098 A1 | 11/2017 | Denier |
| 2018/0373898 A1 | 12/2018 | Grocutt et al. |
| 2020/0042461 A1 | 2/2020 | Tsirkin et al. |
| 2020/0184112 A1 | 6/2020 | Wallach |

OTHER PUBLICATIONS

Carna, Stefano, et al. "Fight Hardware with Hardware: System-wide Detection and Mitigation of Side-Channel Attacks using Performance Counters." Digital Threats: Research and Practice (DTRAP), ACM, 2022.

Extended European Search Report, EP 19894288.0, mailed on Aug. 2, 2022.

Processors with Security Levels Adjustable per Applications, U.S. Appl. No. 16/210,605, filed Dec. 5, 2018, Steven Wallach.

* cited by examiner

PROCESSORS WITH SECURITY LEVELS ADJUSTABLE PER APPLICATIONS

RELATED APPLICATIONS

The present application is a continuation application of U.S. patent application Ser. No. 16/210,605, filed Dec. 5, 2018 and issued as U.S. Pat. No. 11,100,254 on Aug. 24, 2021, the entire disclosure of which application is hereby incorporated herein by reference.

FIELD OF THE TECHNOLOGY

At least some embodiments disclosed herein relate generally to computer architecture and more specifically, but not limited to, security and performance of processors.

BACKGROUND

A typical computer processor receives instructions and/or data from a main memory of the computer system for processing. The instructions and/or data can be cached for the processor. In some instances, unauthorized access to the content in the main memory or the processor cache may be made. For example, multiple processors or processing cores formed on a same die can share the main memory. One processor or processing core can access the content for another processor or processing core through the shared main memory and/or a processor cache memory through memory sharing and/or a cache coherence protocol.

For example, speculative execution is a computing technique where a processor executes one or more instructions based on the speculation that such instructions need to be executed under some conditions, before the determination result is available as to whether such instructions should be executed or not. Speculative execution can lead to security vulnerabilities where unauthorized access to content can be made. Examples of security vulnerabilities in computer processors include Meltdown and Spectre that were made public in 2018. Meltdown is a hardware vulnerability that allows a rogue process to read all memory without authorization.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes techniques for balancing security and performance in a computer processor.

Logic circuits can be added to a computer processor to enhance the security of the computer processor. However, such arrangements made to improve security can degrade the performance of the computer processor. As a result, a computer processor configured with improved security may have a performance level lower than a computer processor without the security improvements.

In general, different applications programmed to be executed on a same computer processor can have different security requirements. Some applications may require high security levels to eliminate, or reduce to a maximum degree, non-authorized access to any information, data, and/or instruction execution status. However, other applications may not require such a high security level.

In the present disclosure, a computer processor is configured to have different modes of operations configured for different trade-offs between performance and security. A set of instructions of a computer program can be executed in any of the security modes of the computer processor to obtain the same execution result from a given data set. However, executing the set of instructions in one mode can provide enhanced security protection (e.g., at the expense of performance), while executing the same set of instructions in another mode can provide enhanced performance/speed (e.g., with reduced security protection). Thus, the users and/or the programmers of the set of instructions are provided with the options to select a mode of execution that is optimized for a particular computer program and/or for a particular instance of the execution of the computer program. In some instances, the operating system of the computer system can select the security level in accordance with a set of rules (e.g., based on the identity of the user running a program).

Preferably, the security mode in which the computer processor executes the set of instructions can be selected for instructions of a program based on an attribute of the program, a virtual address of the program, or a setting or preference for the instance of execution of the program. Thus, when the computer processor is executing the instructions of a first program, the computer processor can be dynamically configured to run in a first security mode (e.g., configured for enhanced security); and when the computer processor is executing the instructions of a second program, the computer processor can be dynamically configured to run in a second security mode (e.g., configured for enhanced performance), as illustrated in FIG. 1.

Figure 1:
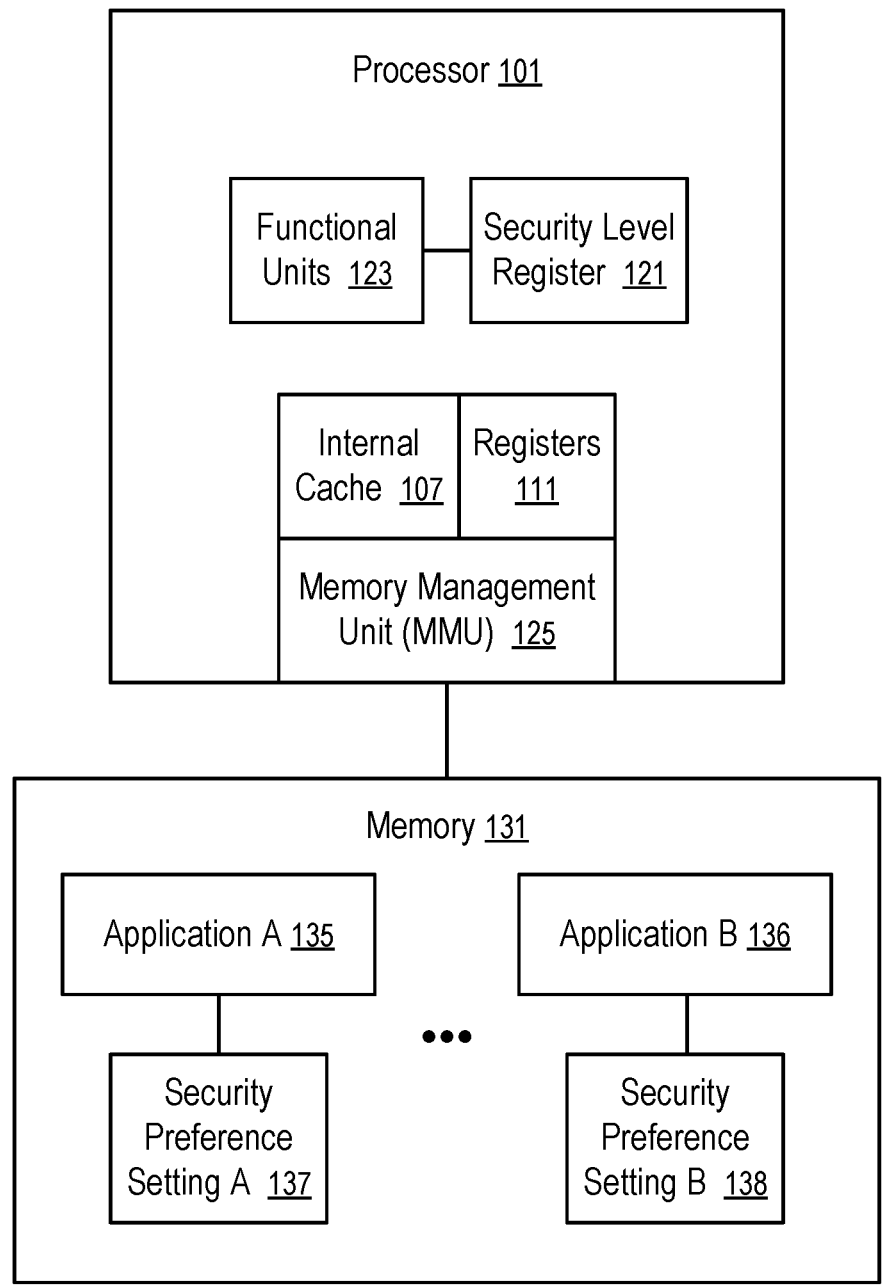
FIG. 1 shows a processor having a security level register configurable by or for applications for their execution according to one embodiment.

FIG. 1 shows a processor (101) having a security level register (121) configurable by or for applications (e.g., 135, . . . , 136) for their execution according to one embodiment.

The processor (101) of FIG. 1 has a set of functional units (123) (e.g., execution units, control logic). The security operations configured in the functional units (123) can be adjusted by the content in the security level register (121).

For example, the security level register (121) can contain a setting identifying a high-performance mode. When such a setting is contained in the security level register (121), the functional units (123) are dynamically configured to relax security operations for an enhanced performance level.

For example, the security level register (121) can alternatively contain a setting identifying a high-security mode. When such a setting is contained in the security level register (121), the functional units (123) are dynamically configured to tighten security operations for enhanced security level.

Optionally, the security level register (121) can be configured to store a level indicator selected from a plurality of predefined level indicators. Each of the predefined level indicators causes the functional units (123) to implement a particular combination of security-performance trade-offs.

Alternatively, the security level register (121) can include a set of security feature selectors; and each of security features can be selected/configured individually/separately using one or more parameters. The security register can be set by the operating system of the computer system and/or by the processor (101) based on the attributes of the object referenced (e.g., as referenced via a memory address register (169) illustrated in FIG. 2). In some instances, the computer system does not provide the user of a computer program with privilege to modify or access the security level register (121).

Figure 2:
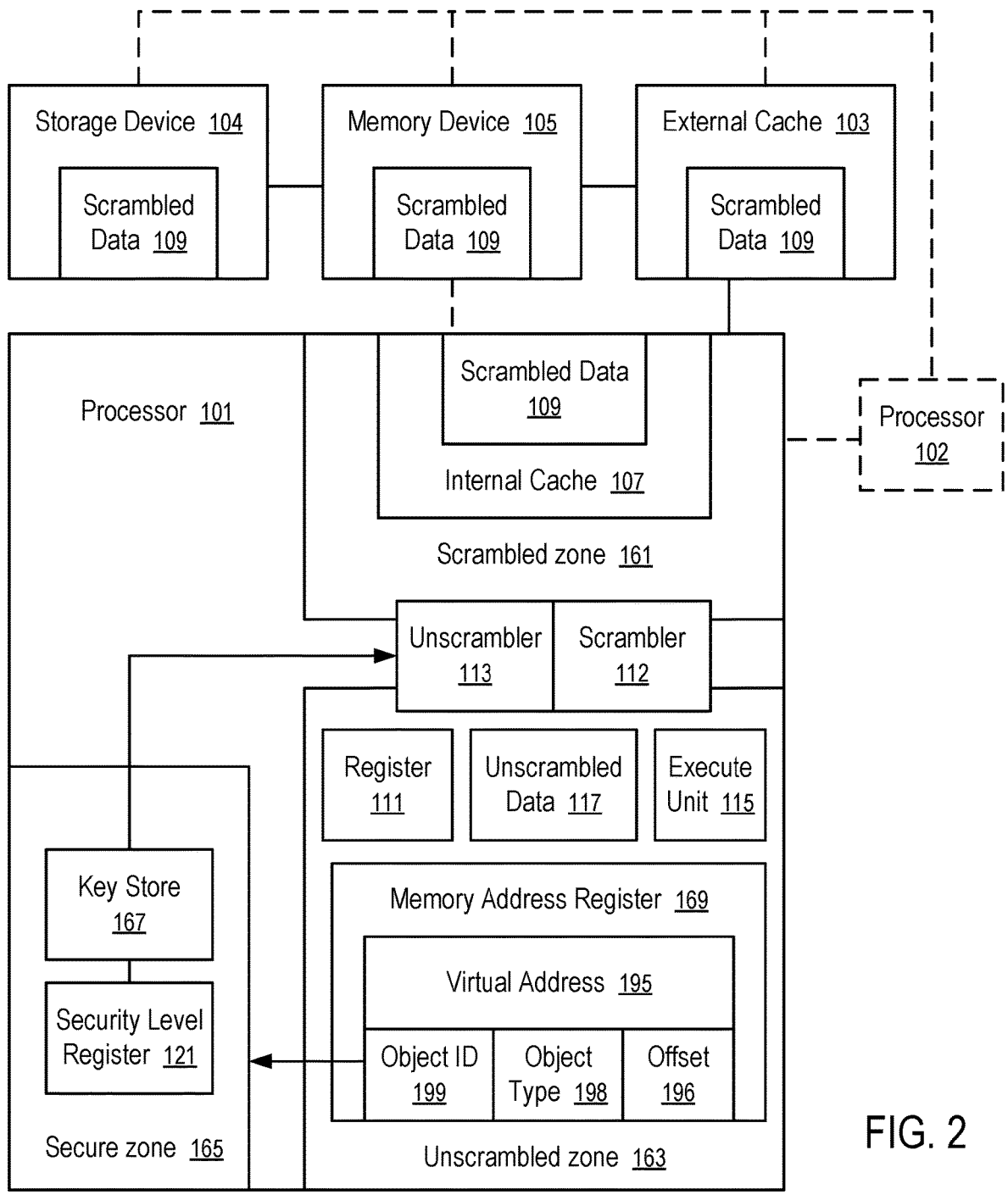
FIG. 2 shows an example of a security level register controlling data scrambling operations in a processor according to one embodiment.
Figure 6:
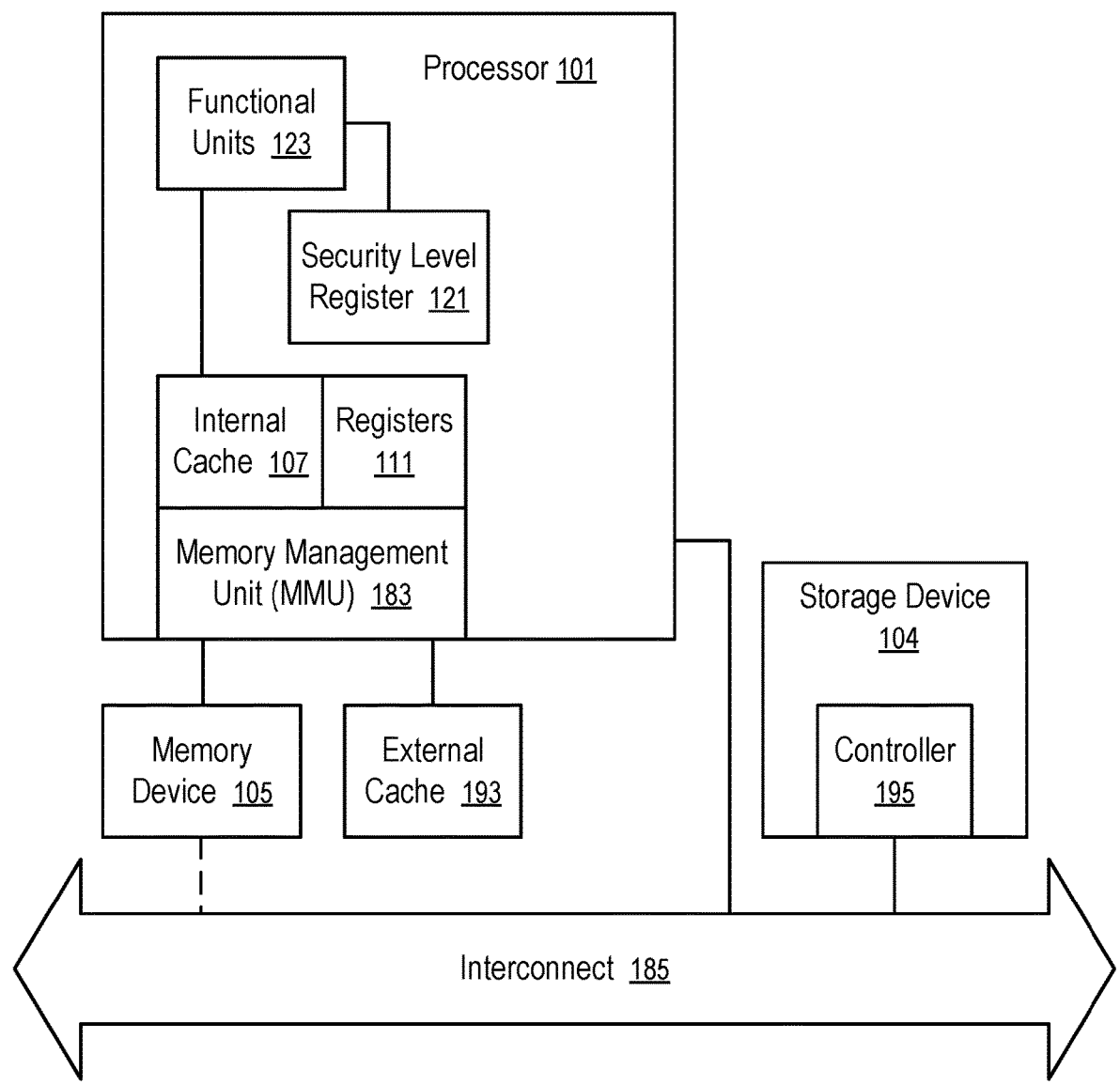
FIG. 6 show a computing system in which the method of FIG. 5 can be implemented.

The processor (101) of FIG. 1 has a memory management unit (MMU) (125) configured to load data and instructions from memory (131) into an internal cache (107) of the processor (101) for processing and execution. As illustrated in FIG. 2 and FIG. 6, the memory (131) can be a memory device (105), an external memory (103), or a storage device (104). In general, instructions of an application (135 or 136) can be loaded by the MMU (125) into an internal cache (107) for execution by the functional units (123) of the processor (101). Data/operands of respective instructions can be loaded into the registers (111) for processing by the respective instructions; and the execution results can be initially placed in the registers (111).

Preferably, the security level register (121) can be configured differently for the execution of different applications (e.g., 135, . . . , 136) based on the security preference settings (e.g., 137, . . . , 138) of applications (e.g., 135, . . . , 136). For example, one security preference settings (e.g., 137) can be used in the security level register (121) to configure the processor (101) in a high security mode with reduced performance; and another security preference settings (e.g., 137) can be used in the security level register (121) to configure the processor (101) in a high performance mode with relaxed security operations.

For example, application A (135) can have a security preference setting A (137); and application B (136) can have a different security preference setting B (138). When application A (135) is being loaded in the internal cache (107) of the processor (101) for execution, the security level register (121) is configured to contain the security preference setting A (137); and when application B (136) is being loaded in the internal cache (107) of the processor (101) for execution, the security level register (121) is configured to contain the security preference setting B (138). The operations to configure the security level register (121) can be performed as part of starting the execution of a program (e.g., 135 or 136) by the operating system of the computer system. In general, when a program (e.g., 135 or 136) is started, various registers are initialized by the operating system; using a set of predetermined rules, the operating system can determine the content of the security level register (121) (e.g., based on the identity of the user running the program (e.g., 135 or 136), and/or the security preference setting of the program (e.g., 135 or 136)).

In some implementations, the applications (135, . . . , 136) can be programmed to have instructions that are responsible for loading their security reference settings (137, . . . , 138) into the security level register (121).

In other implementations, the security preference settings (137, . . . , 138) are configured as security attributes of the respective applications (135, . . . , 136). When any instruction of an application (e.g., 135 or 136) is being executed by the processor (101), the processor (101) and/or the operating system of the computer system is configured to load the respective security preference setting (e.g., 137 or 138) into the security level register (121). For example, the security attributes can be identified based on the virtual memory addresses of the respective applications (135, . . . , 136).

In some instances, different users of a same application (e.g., 135, or 136) can have different security requirements. Thus, the security preference settings (e.g., 137, or 138) can be configured as a run time environmental parameter of the respective application (e.g., 135, or 136). The run time environmental parameter can be managed by an operating system of the computer system and changed from one execution instance of the application (e.g., 135, or 136) to another execution instance of the same application (e.g., 135, or 136).

When the execution in the processor (101) switches from an instruction of the application A (135) to an instruction of the application B (136), the content of the security level register (121) is changed from the security preference setting A (137) to the security preference setting B (138); and the security mode of operation of the functional units (123) is changed according to the content in the security level register (121).

In general, the applications (135, . . . , 136) can be separate programs having different security preference settings (137, . . . , 138). In some instances, the applications (135, . . . , 136) can be separate routines with different security preference settings (137, . . . , 138); and one routine may call another routine for services.

The security level register (121) of FIG. 1 allows individual applications (135, . . . , 136) to be executed at a preferred balance point of security and performance.

For example, the computer processor (101) can be configured to operate on data in a scrambled form in the internal cache (107) in one mode for enhanced security, and operate on unscrambled data in the internal cache (107) in another mode for enhanced performance; and the security level register (121) indicates whether or not the data in the internal cache (107) is scrambled.

For example, the computer processor (101) can be configured to operate on data secured using a long scramble key in the internal cache (107) in one mode for enhanced security, and operate on data secured using a short scramble key in the internal cache (107) in another mode for enhanced performance; and the security level register (121) indicates the length of scramble keys used in security operation. The unscrambler (113) and the scrambler (112) are both capable of processing using short and long scramble keys. For example, a short scramble key can have only 32 random bits that are applied to the first and second half of a 64-bit word respectively to scramble the 64-bit word; and alternatively, a long scramble key can have 64 random bits that are applied to the entire 64-bit word.

In another example, the computer processor (101) can be configured to operate on data secured using a computational-intensive encryption key in the internal cache (107) in one mode for enhanced security, and operate on data secured using a computational-efficient scramble key in the internal cache (107) in another mode for enhanced performance.

In a further example, the computer processor (101) can be configured to operate on data secured using a scramble key and an inversion key in the internal cache (107) in one mode for enhanced security, operate on data secured using a scramble key in the internal cache (107) in another mode, operate on data secured using an inversion key in the internal cache (107) in another mode, and operate on unscrambled data in the internal cache (107) in a further mode for further enhanced performance with reduced security protection.

For example, scramble keys can be used to rearrange the positions of bits within a data word without changing the values of the bits. After shuffling the positions of the bits of the original data word, a scrambled data word is generated. Without the scramble keys (or the corresponding unscramble keys), the original data word cannot be recovered from the scrambled data word.

For example, an inversion key can be used to selectively invert the bit value of a data word at selected positions identified by the inversion key. After selectively invert the bit values of the original data word, a secured data word is generated. Without the inversion keys, the original data word cannot be recovered from the secured data word.

For example, an encryption key can be used to combine and convert the values of the bits of an original data word into values of the bits of an encrypted data word using a predetermined cryptographical algorithm. The encryption can be performed using a symmetric cryptographical algorithm that requires the same encryption key to decrypt the encrypted data word, or an asymmetric cryptographical algorithm that requires a different decryption key to decrypt the encrypted data word, where the decryption key can be difficult to identify from the encryption key. Different cryptographical algorithms have different trade-offs in performance and security.

In general, the computer processor (101) can be configured to perform security operations in various combinations for various security modes that are selectable via the security level register (121). For example, a data item can be secured in the cache (107) and the memory (131) for a program (e.g., 135 or 136) via scramble keys, inversion keys, and/or encryption keys implemented via different cryptographical algorithm for a desired level of performance-security balance, or can be stored in the cache (107) and the memory (131) in the clear (e.g., without scrambling, inversion, encryption) for minimized performance impact.

Figure 3:
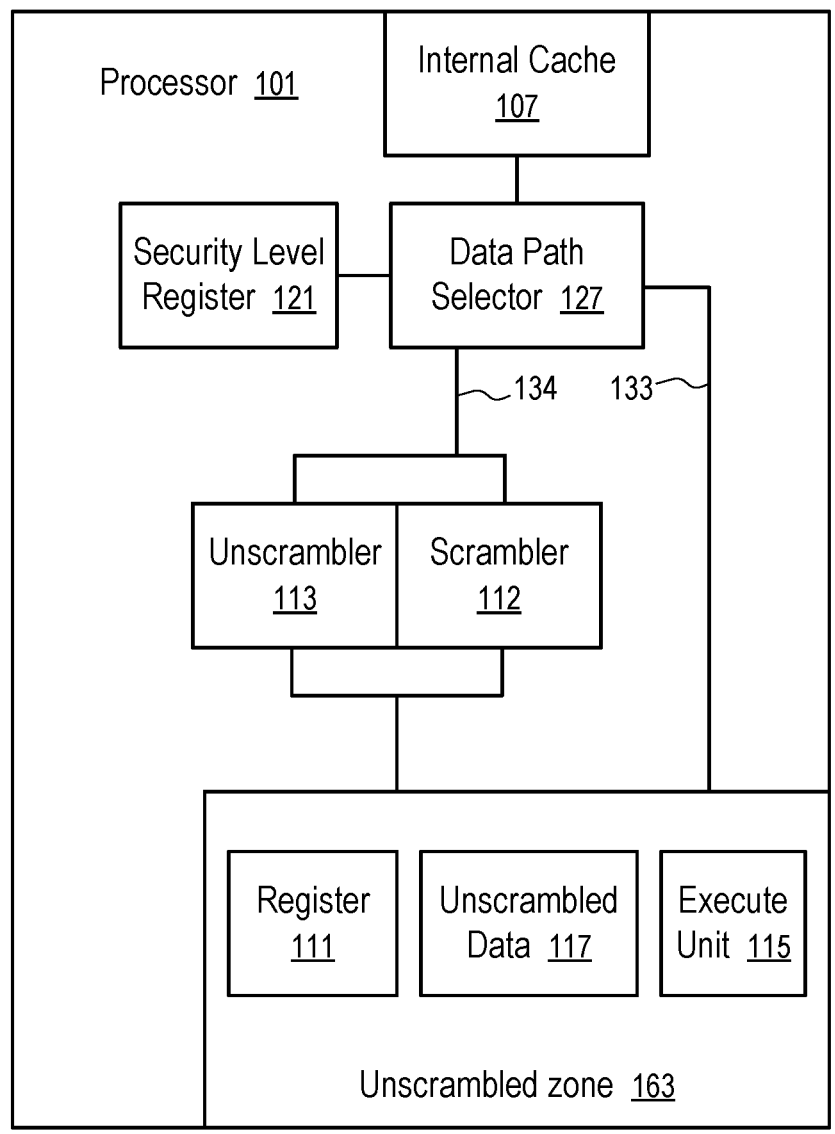
FIG. 3 shows another example of a security level register controlling data paths in a processor according to one embodiment.

For example, security operations related to data scrambling within the processor (101) can be controlled by the security level register (121) in ways illustrated in FIG. 2 and/or FIG. 3.

FIG. 2 shows an example of a security level register (121) controlling data scrambling operations in a processor (101) according to one embodiment. For example, the processor (101) of FIG. 2 can be an implementation of the processor (101) of FIG. 1.

FIG. 2 shows a key store (167) in the processor (101) for data security.

In FIG. 2, the processor (101) has an unscrambled zone (163) for performing computation on data (117) in an unscrambled form such that classical computer processor techniques can be used to perform the computations in the unscrambled zone (163). Other processors (e.g., 102) can be provided with access to certain resources of the processor (101), such as the storage device (104), the memory device (105), the external cache (103), and/or the internal cache (107). However, these processors (e.g., 102) are prevented from accessing the unscrambled zone (163) of the processor (101). For example, the processors (101 and 102) can be different processing cores formed on a same silicon die and/or packaged in a same integrated circuit chip. In other examples, the processors (101 and 102) can be packaged in different integrated circuit chips and connected via a communication connection, such as a bus, an interconnect, a network, etc.

A malicious program, for example, may run in a processor (102) and attempt to gain unauthorized access to content to be processed by the processor (101) (e.g., using security vulnerabilities such as Meltdown and Spectre). To protect against such unauthorized access, data (109) can be stored in a scrambled form in locations outside the unscrambled zone (163). For example, the data (109) is stored in a scrambled form in the storage device (104), in the memory device (105) of a computer, and in the external cache (103) that is shared between the processors (101 and 102). Further, the data (109) can be stored in a scrambled form in the scrambled zone (161) of the processor (101), such as the internal cache (107) of the processor (101), when the processor (102) can access the internal cache (107) via a cache coherence protocol.

In FIG. 2, the unscrambler (113) of the processor (101) converts the scrambled data (109) into the unscrambled data (117) when the processor (101) runs the instructions that are authorized to process the scrambled data (109). The presence of the unscrambled data (117) is confined within the unscrambled zone (163). Since another processor (102) is prevented from accessing the unscrambled zone (163) of the processor (101), a malicious program running in the processor (102) can be prevented from gaining unauthorized access to the unscrambled data (117) (e.g., through security vulnerabilities such as Meltdown and Spectre).

In FIG. 2, the processor (101) has a secure zone (165) that includes a key store (167) and a security level register (121). The key store (167) has the keys for the unscrambler (113) and the scrambler (112) for various data objects. Without access to the respective keys of the objects, the processors (101 and 102) cannot recover the unscrambled data (117) from the scrambled data (109).

In FIG. 2, the access to the key store (167) is based at least in part on the virtual address (195) used to load the scrambled data (109) for operations to be performed within the unscrambled zone (163).

For example, the virtual address (195) can include fields such as object ID (199), object type (198), and/or offset (196).

For example, the virtual memory address (195) can have a predetermined width (a predetermined bits) and stored in the memory address register (169) of the processor (101). The virtual address (195) can include a portion representing an object ID (199) and a portion representing an offset (196) within the object represented by the object ID (199).

For example, an object located at the virtual address (195) can be a set of instructions or a routine; and the object ID (199) of the virtual address (195) can be used to identify certain proprieties of the instruction and/or the routine, such as access rights.

For example, an object located at the virtual address (195) can be a data file, data set, or data item; and the object ID (199) of the virtual address (195) can be used to identify access rights of the data.

In some instances, an object name server is configured to store attributes of an object identified via the object ID (199). The processors (101 and 102) can query the object name server to obtain the attributes for access control.

In some instances, a static object ID of a predetermined value (e.g., 0) can be used to represent a kernel object of an operating system. Thus, the static object ID specified in the memory address can be used to identify certain access restrictions without having to communicate with an object name server. Some details and examples of static object IDs in memory addresses for computer processors to load instructions for execution can be found in U.S. patent application Ser. No. 16/028,840, filed Jul. 6, 2018 and entitled "Static Identifications in Object-based Memory Access," the entire disclosure of which application is hereby incorporated herein by reference.

In some instances, the virtual memory address (195) and/or the object ID (e.g., 199) of the memory address can include a portion representing an object type (198). For example, an object type (198) of a value from 0 to 3 can be used to identify a kernel object of an operating system. For example, an object type (198) of a value of 4 to 5 can be used to specify that the offset is an address of different widths (e.g., a 64-bit address or 32-bit address included within the memory address that has 128 bits). For example, an object type (198) of a value of 6 to 7 can be used to specify that a predetermined portion of the object ID is to be interpreted as an identifier of a local object or an object in Partitioned Global Address Space (PGAS). For example, an object type (198) of a value of 32 can be used to specify that the remaining portion of the object ID is to be interpreted as an identifier of an object defined in a server.

The object type (198) and/or the object ID (199) can be optionally used to determine access privileges, run time environmental parameters, security preference settings (e.g., 137, ..., 138).

In FIG. 2, the object ID (199) can be used to access the key store (167) to retrieve a key for the object represented by the object ID (199). Thus, when the unscrambled zone (163) is authorized to load, via the virtual address (195), the scrambled data (109) into the unscrambled zone (163) for processing, the key for the unscrambler (113) can be retrieved or obtained from the key store (167) to generate the unscrambled data (117) from the scrambled data (109).

When the unscrambled data (117) leaves the unscrambled zone (163) (e.g., to be stored at the virtual address (195) as a computation result and/or as part of the object represented by the object ID (199)), the scrambler (112) converts the unscrambled data (117) into the scrambled data (109). By reducing the locations and duration of the presence of the unscrambled data (117), data security of the computer system is improved.

The object ID (199) can be further used to identify the security preference settings (e.g., 137, ..., 138) of the object represented by the object ID (199) and apply the security preference settings (e.g., 137, ..., 138) of the object to control the operations of the key store (167).

For example, the security level register (121) can control the length of scramble keys used in the unscrambler (113) and the scrambler (112). When scramble keys of a shorter length are used, the performance impact of scrambling/unscrambling operations can be reduced, while the security protection provided via scrambling/unscrambling is also reduced. When scramble keys of a longer length are used, the performance impact of scrambling/unscrambling operations can be increased, while the security protection provided via scrambling/unscrambling is also improved.

In some instances, one object can have a security preference setting (e.g., 137) that uses keys of a predetermined length in the scrambler (112) and the unscrambler (113), while another object can have a security preference setting (e.g., 137) that uses unscrambled data in the internal cache (107) and bypasses the scrambler (112) and the unscrambler (113), as further illustrated in FIG. 3.

In general, the unscrambled data (117) can be an instruction, an operand, and/or a result of the execution unit (115) executing an instruction. The unscrambled zone (163) can include a register to store a virtual address for loading scrambled operands into the unscrambled zone (163), a register to store a virtual address for exporting scrambled results from the unscrambled zone (163), and/or a register (e.g., program counter) to store a virtual address for loading scrambled instructions into the unscrambled zone (163).

For example, the unscrambled zone (163) can include a program counter, programmer visible register files, and/or a memory address register. Programs running outside of the unscrambled zone (163) of a processor (101) (e.g., in another processor (102), such as a separate processing core), are generally prevented from accessing the unscrambled zone (163) of the processor (101), although such external programs may access the caches (e.g., 103 and/or 107) and the main memory (e.g., 105) where the content is in a scrambled form.

The execution units (e.g., 115) can perform operations (e.g., arithmetic operations) on operands stored in registers and generate results in registers. Such registers for operands and results can be configured in the unscrambled zone (163) such that the execution units (e.g., 115) operate and generate data in the unscrambled form; and therefore, scrambling outside of the unscrambled zone (163) does not impact the operations and/or efficiency of the execution units (e.g., 115).

The program counter can increase the address stored in it by one to execute the next instruction, or be assigned a branch address to execute the instruction at the given branch address. The program counter can also be configured in the unscrambled zone (163) such that its operations are based on unscrambled addresses. Thus, the content of the program counter and/or addresses for identifying operands in the main memory (e.g., 105) can be unscrambled addresses in the unscrambled zone (163).

FIG. 3 shows another example of a security level register (121) controlling data paths in a processor (101) according to one embodiment. For example, the processor (101) of FIG. 3 can be an implementation of the processor (101) of FIG. 1. For example, the data path selector (127) can be implemented in the processor (101) of FIG. 2. For example, the content of the security level register (121) can be set based on an object ID (199) as illustrated in FIG. 2.

The processor (101) of FIG. 3 has a data path selector (127) controlled by the content of the security level register (121).

When the security level register (121) has a predetermined security preference setting (e.g., 137), the data in the internal cache (107) to be processed in the unscrambled zone (163) is not scrambled. Thus, the data path selector (127) selects/uses a data path (133) that bypasses the unscrambler (113) and scrambler (112), such that the data delay caused by the unscrambler (113) and scrambler (112) can be reduced or eliminated.

When the security level register (121) has another security preference setting (e.g., 138), the data in the internal cache (107) for processing in the unscrambled zone (163) is scrambled. Thus, the data path selector (127) uses a data path (134) that goes through the unscrambler (113) and scrambler (112), such that the data security of the execution is improved via keeping data scrambled in a scrambled zone (161) within the processor (101).

The unscrambler (113) and the scrambler (112) can be implemented using multiplexers that select bits (or data items) according to a set of keys to rearrange the order of bits (or data items) in an input to generate an output. For example, when the input is an unscrambled data (117), the output having bits rearranged according to a set of keys provides the scrambled data (109); and rearrange the order of bits in the scrambled data (109) according to a set of keys can recover the unscrambled data (117). Details and examples of the unscrambler (113) and the scrambler (112)

can be found in U.S. patent application Ser. No. 16/054,913, filed Aug. 3, 2018 and entitled "Data Protection in Computer Processors", and 16/134,387, filed Sep. 18, 2018 and entitled "Key Management in Computer Processors", the entire disclosures of which applications are hereby incorporated herein by reference.

FIG. 2 and FIG. 3 illustrate the use of a security level register (121) to selectively control the deployment of data scrambling in the processor (101) and/or the length of keys used for scrambling/unscrambling. In general, the security level register (121) can also be used to adjust the deployment of other security measures.

Figure 4:
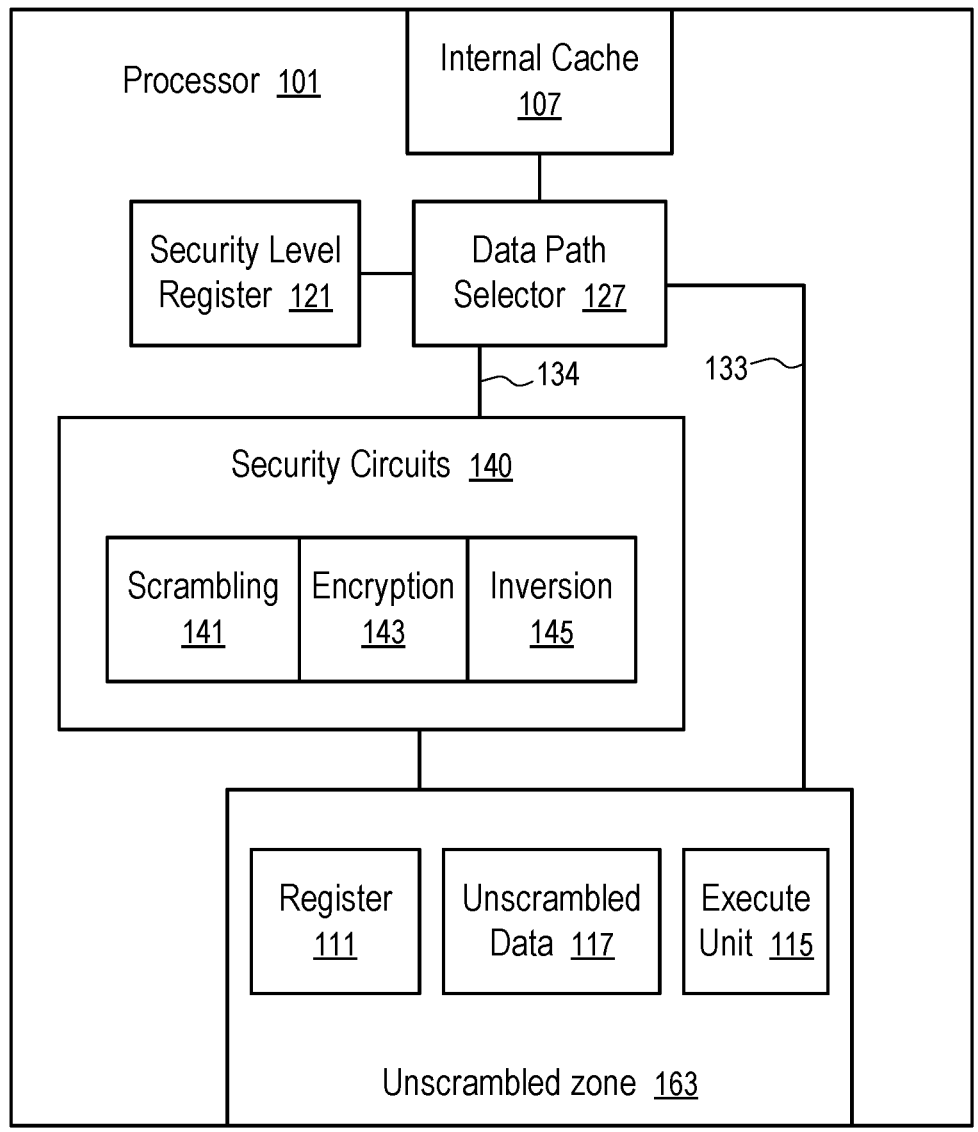
FIG. 4 shows a further example of a security level register controlling data paths in a processor according to one embodiment.

For example, as illustrated in FIG. 4, the processor (101) of FIG. 3 can be augmented to include inversion circuits (e.g., 145) that use inversion keys to secure data, and/or encryption/decryption circuits (e.g., 143) that use encryption/decryption keys to secure data. Further, different encryption/decryption circuits can implement different cryptographical algorithms with different security/performance trade-offs. The data path selector (127) can be controlled by the security level register (121) to selectively bypassing some or all of the security circuits (140) of the processor (101). The security circuits (140) can include scrambling circuits (e.g., 141) (such as the unscrambler (113) and the scrambler (112)), encryption/decryption circuits (e.g., 143), and/or inversion circuits (e.g., 145). The data path selector (127) can be controlled by the security level register (121) to selectively apply a subset of the security circuits (140) in a selected order identified by the content of the security level register (121). For example, one path can be configured to apply scrambling (141) followed by inversion (145), while another path can be configured to apply inversion (145) followed by scrambling (141) or encryption (143).

For example, U.S. patent application Ser. No. 16/029,135, filed Jul. 6, 2018, discloses security techniques of using separate branch target buffers for different levels of calls, the entire disclosure of which application is hereby incorporated herein by reference. The content of the security level register (121) can be used to control the selective deployment of the security measurement and/or the level of calls to be separated by the separate branch target buffers.

For example, U.S. patent application Ser. No. 16/028,930, filed Jul. 6, 2018, discloses security techniques of using shadow cache for securing conditional speculative instruction execution, the entire disclosure of which application is hereby incorporated herein by reference. The content of the security level register (121) can be used to control the selective deployment of shadow cache.

Figure 5:
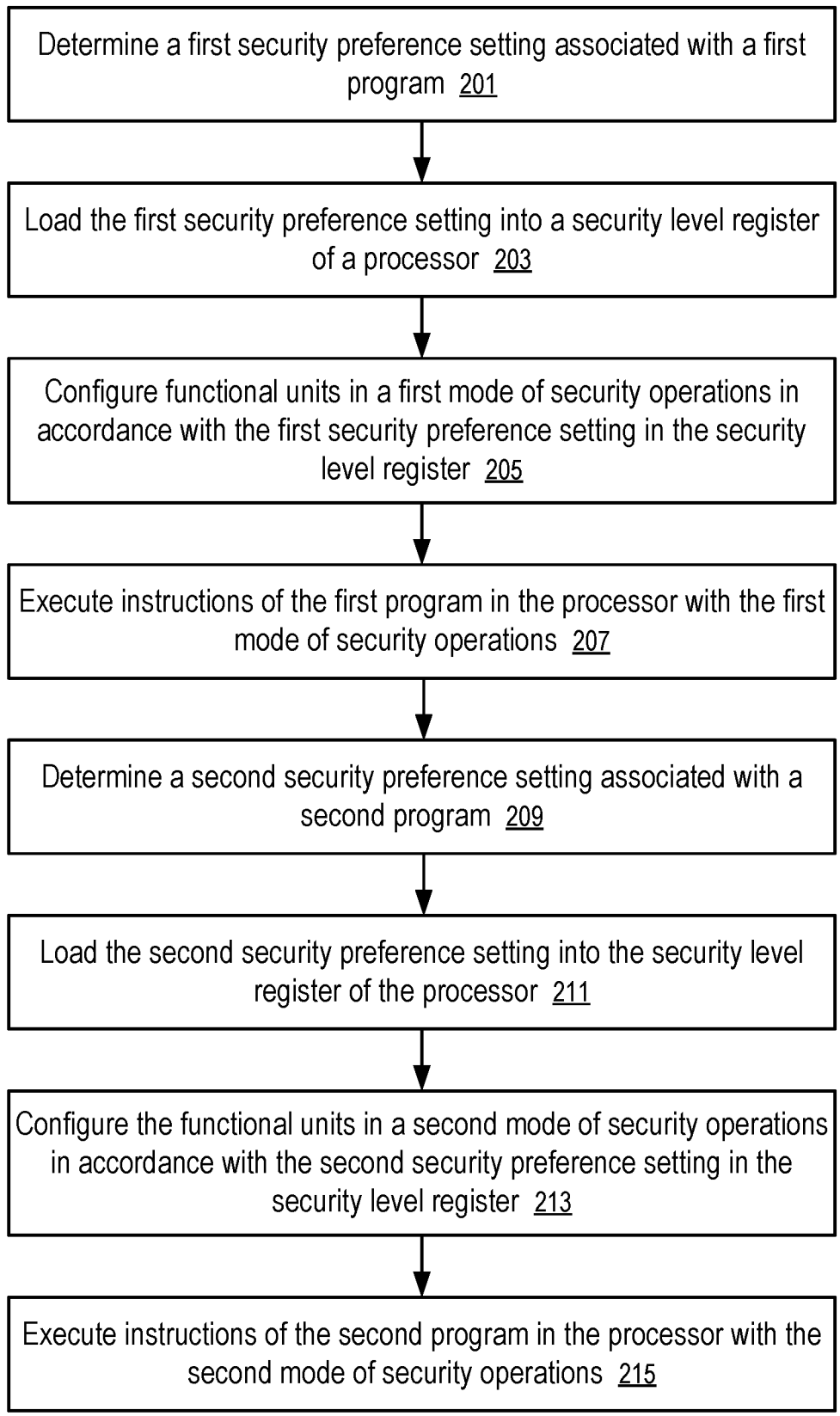
FIG. 5 shows a method to configure security operations in a processor according to one embodiment.

FIG. 5 shows a method to configure security operations in a processor (101) according to one embodiment. For example, the method of FIG. 5 can be implemented in a processor (101) of FIG. 1, 2, 3, or 4.

At block 201, the processor (101) determines a first security preference setting (e.g., 137) associated with a first program (e.g., 135).

For example, the first security preference setting (e.g., 137) can be associated with the first program (e.g., 135) as an environment variable managed by an operating system for the execution of the first program (e.g., 135).

For example, the first security preference setting (e.g., 137) can be associated with the first program (e.g., 135) as a security parameter of the first program (e.g., 135) configured in a look up table used to translate a virtual memory address of the first program (e.g., 135) to a physical memory address.

For example, the first security preference setting (e.g., 137) can be programmed in the first program (e.g., 135), where one or more instructions of the first program can be executed to identify or compute the first security preference setting (e.g., 137).

At block 203, the processor (101) loads the first security preference setting (e.g., 137) into a security level register (121) of the processor (101).

At block 205, the processor (101) configures functional units (123) in a first mode of security operations in accordance with the first security preference setting (e.g., 137) in the security level register (121).

At block 207, the processor (101) executes instructions of the first program (e.g., 135) with the first mode of security operations.

For example, the first mode of security operations can include keeping data in a scrambled form in the internal cache (107), using a shadow cache for securing conditional speculative instruction execution, and/or using separate branch target buffers for different levels of calls.

At block 209, the processor (101) determines a second security preference setting (e.g., 138) associated with a second program (e.g., 136).

At block 211, the processor (101) loads the second security preference setting (e.g., 138) into the security level register (121) of the processor (101).

At block 213, the processor (101) configures the functional units (123) in a second mode of security operations in accordance with the second security preference setting (e.g., 138) in the security level register (121).

At block 215, the processor (101) executes instructions of the second program (e.g., 136) with the second mode of security operations.

For example, the first mode can include a set of security operations performed that is not performed in the second mode. One example of such security operations performed in the first mode but not in the second mode is unscrambling data in the cache (107) for an unscrambled zone (163) of the processor (101) and scramble data before outputting data from the unscrambled zone (163) into the cache (107).

Another example of such security operations performed in the first mode but not in the second mode is using separate branch target buffers for different levels of calls.

A further example of such security operations performed in the first mode but not in the second mode is shadow cache for securing conditional speculative instruction execution.

Instructions executed on a same data set in the first security mode can provide results same as being executed in the second security mode. However, when execution is in the first security mode, the likelihood of a security breach is reduced. When the execution is in the second security mode, the execution time duration is reduced.

As illustrated in FIG. 3 and FIG. 4, the security level register (121) can dynamically configure the functional units (123) to bypass a logic circuit (e.g., 113 and 112) when the security level register (121) contains the second setting (e.g., 138). The logic circuit (e.g., 113 and 112) is active in active in the first security mode, but not used in the second security mode. The functional units (123) can include execution units (115) of the processor (101), the data path selector (127), unscrambler (113)/scrambler (112), shadow cache, and/or separate branch target buffers.

FIG. 6 show a computing system in which the method of FIG. 5 can be implemented.

The computing system of FIG. 6 can include a processor (101) having an internal cache (107), a memory device (105), an external cache (107), and a storage device (104) that is connected to the processor (101) and/or the memory device (105) via an interconnect (185).

For example, the processor (101) can have functional units (123) to execute instructions. The processor (101) can further include registers (111) to contain memory addresses, data/operands of instructions to be executed in the functional units (123), and/or execution results of the instructions.

For example, the registers (111) can include a program counter for loading instructions for execution, and a memory address register. When an instruction is being executed in the processor (101), the memory address stored in the memory address register can be used to load an operand of the instruction, and/or store a computing result generated from executing the instruction.

The processor (101) can dynamically configured the security operations of the functional units (123) based on the content/setting contained in the security level register (121). For example, the security level register (121) can control a data path selector (127) of FIG. 3 or 4 to select a data path (133 or 134), and/or control a key store (167) of FIG. 2 to identify a length of keys for the scrambler (112) and the unscrambler (113).

In some instances, the addresses used the registers of the processor (101) are virtual memory addresses; and a memory management unit (MMU) (125) can convert the virtual memory addresses to physical memory addresses to access the external cache (107), the memory device (105), and/or the storage device (104).

For example, the data in the memory device (105) can be cached in the external cache (107) of the processor (101) and/or the internal cache (107) of the processor (101).

For example, the data in the external cache (107) can be cached in the internal cache (107).

For example, the data in the storage device (104) can be cached in the memory device (105), in the external cache (107), and/or in the internal cache (107).

In some instances, the memory management unit (MMU) (125) controls the data movement among the internal cache (107), the external cache (107), and the memory device (105).

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to perform processing within a memory device. Thus, a processor (e.g., 101) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A device, comprising:
    a logic circuit operable to perform operations in response to instructions, the logic circuit comprising a plurality of functional units configured to execute instructions configured as a program;
    a plurality of execution units;
    a cache; and
    a register coupled to the logic circuit, wherein:
        in response to the register having a first value, the logic circuit is configured to execute the instructions with a first level of security; and
        in response to the register having a second value, the logic circuit is configured to execute the instructions with a second level of security;
    wherein the register is configurable to have the first value during execution of instructions configured as a first program; and configurable to have the second value during execution of instructions configured as a second program;
    wherein at least one operation performed at the first level of security is not performed at the second level of security;
    wherein the operation comprises unscrambling data from the cache to the execution units, and scrambling data from the execution units to the cache.

2. The device of claim 1, wherein at least one of the functional units is configured to operate at the first level of security when the register has the first value and at the second level of security when the register has the second value.

3. The device of claim 1, wherein security operations performed by the logic circuit at the first level are different from security operations performed by the logic circuit at the second level.

4. The device of claim 1, wherein a portion of the logic circuit is configured to be active at the first level and configured to be bypassed in the second level.

5. The device of claim 1, wherein the functional units are configurable to execute an instruction faster at the second level of security than at the first level of security.

6. The device of claim 1, wherein the logic circuit further comprises:
    a selector of data path;
    a first data path coupled with the selector and the execution units; and
    a second data path coupled with the selector and the execution units;
    wherein the register is configured to cause the selector to activate the first data path and deactivate the second data path when the register has the first value; and
    wherein the register is configured to cause the selector to deactivate the first data path and activate the second data path when the register has the second value.

7. The device of claim 6, further comprising:
    wherein the selector is configured to connect the cache to the execution units via the first data path at the first level of security; and wherein the selector is configured to connect the cache to the execution units via the second data path at the second level of security.

8. The device of claim 7, wherein the first data path includes a security circuit configured to perform a security operation; and the second data path does not include the security operation.

9. The device of claim 8, wherein the security operation includes data scrambling, encryption, or inversion, or any combination thereof.

10. A method, comprising:
performing, by a logic circuit of a processor, operations in response to instructions, the logic circuit comprising a plurality of functional units configured to execute instructions configured as a program; and
loading a content into a register of the processor, wherein the operations comprises:
executing, in response to the content in the register having a first value, the instructions at a first level of security; and
executing, in response to the content in the register having a second value, the instructions at a second level of security;
wherein at least one security operation performed at the first level is not performed at the second level;
wherein a data path couples between a cache of the processor and execution units of the processor;
wherein a portion of the data path is configured to perform a security operation at the first level of security; and
wherein the security operation comprises unscrambling data from the cache to the execution units, and scrambling data from the execution units to the cache.

11. The method of claim 10, wherein the at least one security operation performed at the first level is not performed at the second level to cause the logic circuit of the processor to be faster in execution of a same instruction at the second level of security than at the first level of security.

12. The method of claim 10, further comprising:
selecting, according to the content in the register, the data path between the cache of the processor and the execution units of the processor.

13. The method of claim 10, further comprising:
bypassing the portion of the data path when the content in the register has the second value.

14. The method of claim 13, wherein the security operation comprises:
decrypting data from the cache to the execution units; and
encrypting data from the execution units to the cache.

15. The method of claim 13, wherein the security operation comprises:
inverting data transmitted between the cache and the execution units.

16. A non-transitory computer readable medium storing instructions which, when executed in a processor, cause the processor to perform a method, the method comprising:
loading a first value into a register of the processor;
executing, according to the first value in the register of the processor, instructions of a first application at a first level of security;
loading a second value into the register of the processor; and
executing, according to the second value in the register of the processor, instructions of a second application at a second level of security;
wherein at least one operation performed at the first level of security is not performed at the second level of security;
wherein the operation comprises unscrambling data from a cache to plurality of execution units, and scrambling data from the execution units to the cache.

17. The non-transitory computer readable medium of claim 16, the method further comprising:
skipping, in response to the second value in the register of the processor, a security operation that is performed when the register of the processor has the first value.

* * * * *